United States Patent
Syu et al.

(10) Patent No.: US 7,440,058 B2
(45) Date of Patent: Oct. 21, 2008

(54) LIQUID CRYSTAL DISPLAY PANEL AND LIQUID CRYSTAL DISPLAY DEVICE

(75) Inventors: Chao-Dong Syu, Miaoli County (TW); Shih-Tsung Yang, Taipei County (TW); Chien-Lin Pan, Taoyuan County (TW); Kuan-Chiun Hu, Hsinchu County (TW); Hao-Ting Tien, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 285 days.

(21) Appl. No.: 11/462,371

(22) Filed: Aug. 4, 2006

(65) Prior Publication Data

US 2008/0030665 A1 Feb. 7, 2008

(51) Int. Cl.
*G02F 1/1337* (2006.01)

(52) U.S. Cl. ........................................ 349/123
(58) Field of Classification Search ........... 349/123
See application file for complete search history.

(56) References Cited

U.S. PATENT DOCUMENTS 6,469,762 B1 * 10/2002 Hong et al. ............... 349/123
6,671,009 B1    12/2003 Hattori et al.
6,833,893 B2    12/2004 Kikkawa
2001/0010576 A1 * 8/2001 Lee et al. ................ 349/141

* cited by examiner

Primary Examiner—David C. Nelms
Assistant Examiner—Phu Vu
(74) Attorney, Agent, or Firm—Jianq Chyun IP Office

(57) ABSTRACT

A liquid crystal display panel (LCD panel) includes an active component array substrate, an opposite substrate and an optically compensated birefringence type liquid crystal layer (OCB-type liquid crystal layer). The active component array substrate includes a first substrate, a plurality of first lines, a plurality of second lines, a plurality of pixel structures and a first alignment layer. The first alignment layer possesses a first orientation direction, and the included angle between the first orientation direction and the first lines is between 46 and 74 degree. The opposite substrate has a second alignment layer facing the active component array substrate, and the second alignment layer possesses a second orientation direction parallel to the first orientation direction. The OCB-type liquid crystal layer is disposed between the active component array substrate and the opposite substrate.

16 Claims, 6 Drawing Sheets

LIQUID CRYSTAL DISPLAY PANEL AND LIQUID CRYSTAL DISPLAY DEVICE

BACKGROUND OF THE INVENTION

1. Field of Invention

The present invention relates to a liquid crystal display panel (LCD panel) and a liquid display crystal device (LCD device), and particularly to a LCD panel and a LCD device of optically compensated birefringence type (OCB-type).

2. Description of the Related Art

LCD devices can be categorized into different types according to liquid crystal type, driving method and light source disposition. Wherein, an OCB-type LCD device has advantage such as fast response speed, and is suitable for providing a computer with excellent and smooth frame performance, where fast-varied sequential frames are essential to play an animation or a movie. Therefore, an OCB-type LCD device usually serves as a high-end LCD device. For an OCB-type LCD device to have a fast response performance, however, the optically compensated birefringence liquid crystal molecules (OCB liquid crystal molecules) thereof must be transited from splay state into bend state in order to enter stand-by status and be ready for fast response.

In a conventional OCB-LCD device, the included angle between the orientation direction of an alignment layer and the scan lines of an active component array substrate is 90 degree, which makes the view angle range of a conventional OCB-LCD device too small to meet the wide view angle specification.

FIG. 1 is an angle of view contour of a conventional LCD device. Referring to FIG. 1, with a conventional alignment method, the LCD device has only 160 degree of horizontal angle of view and 140 degree of vertical angle of view, which are obtained under the lowest viewable condition with 10:1 contrast ratio. Thus, the conventional LCD device fails to meet the wide view angle specification requirement. In addition, the maximum contrast ratio is 323.44:1, which suggests a pretty large improvement margin remains.

SUMMARY OF THE INVENTION

Accordingly, an object of the present invention is to provide a LCD panel with an increased viewing angle range.

Another object of the present invention is to provide a LCD panel with an improved maximum contrast ratio.

The present invention provides a LCD panel, which includes an active component array substrate, an opposite substrate and an optically compensated birefringence type liquid crystal layer (OCB-type liquid crystal layer). The active component array substrate includes a first substrate, a plurality of first lines, a plurality of second lines, a plurality of pixel structures and a first alignment layer. Wherein, the first lines and the second lines are disposed on the first substrate, while the pixel structures are disposed on the first substrate and driven by the first lines and the second lines. The first alignment layer is disposed on the first substrate and covers the first lines, the second lines and the pixel structures. The first alignment layer possesses a first orientation direction and the included angle between the first orientation direction and the first lines is between 46 and 74 degree. The opposite substrate has a second alignment layer facing the active component array substrate and the second alignment layer possesses a second orientation direction parallel to the first orientation direction. The OCB-type liquid crystal layer is disposed between the active component array substrate and the opposite substrate.

The present invention provides a LCD device, which includes a backlight module and a LCD panel. The LCD panel is disposed on the backlight module. The LCD panel includes an active component array substrate, an opposite substrate and an OCB-type liquid crystal layer. The active component array substrate includes a first substrate, a plurality of first lines, a plurality of second lines, a plurality of pixel structures and a first alignment layer. The first lines and the second lines are disposed on the first substrate, while the pixel structures are disposed on the first substrate and driven by the first lines and the second lines. The first alignment layer is disposed on the first substrate and covers the first lines, the second lines and the pixel structures. The first alignment layer possesses a first orientation direction and the included angle between the first orientation direction and the first lines is between 46 and 74 degree. The opposite substrate has a second alignment layer facing the active component array substrate and the second alignment layer possesses a second orientation direction parallel to the first orientation direction. The OCB-type liquid crystal layer is disposed between the active component array substrate and the opposite substrate.

In an embodiment of the present invention, the included angle between the first orientation direction and the first lines is between 46 and 54 degree.

In an embodiment of the present invention, the fist lines are scan lines and the second lines are data lines.

In an embodiment of the present invention, the fist lines are data lines and the second lines are scan lines.

In an embodiment of the present invention, the LCD panel further includes a first polarizing plate and a second polarizing plate. Wherein, the first polarizing plate is disposed on the active component array substrate and is opposite to the opposite substrate, and the first polarizing plate possesses a first polarizing direction parallel to the first lines. The second polarizing plate is disposed on the opposite substrate and is opposite to the active component array substrate, and the second polarizing plate possesses a second polarizing direction perpendicular to the first polarizing direction.

In an embodiment of the present invention, the LCD panel further includes a first compensation film and a second compensation film. Wherein, the first compensation film is disposed between the active component array substrate and the first polarizing plate, and the first compensation film possesses a first axis parallel to the first orientation direction. The second compensation film is disposed between the opposite substrate and the second polarizing plate, and the second compensation film possesses a second axis parallel to the second orientation direction.

In an embodiment of the present invention, each pixel structure includes an active component and a pixel electrode. Wherein, the active component is electrically connected to the corresponding first line and second line, while the pixel electrode is electrically connected to the active component.

In an embodiment of the present invention, the opposite substrate further includes a second substrate, a color filter layer and a common electrode layer. Wherein, the color filter layer is disposed on the second substrate, the common electrode layer is disposed on the color filter layer and the second alignment layer is disposed on the common electrode layer.

Based on the above, in the active component array substrate of the LCD panel and the LCD device of the present invention, since the included angle between the first orientation direction of the first alignment layer and the first line is between 46 and 74 degree, therefore, the viewing angle range can be effectively advanced to meet the wide view angle specification requirement. In addition, compared with the prior art, the LCD panel and the LCD device of the present invention possess a larger maximum contrast.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 2:
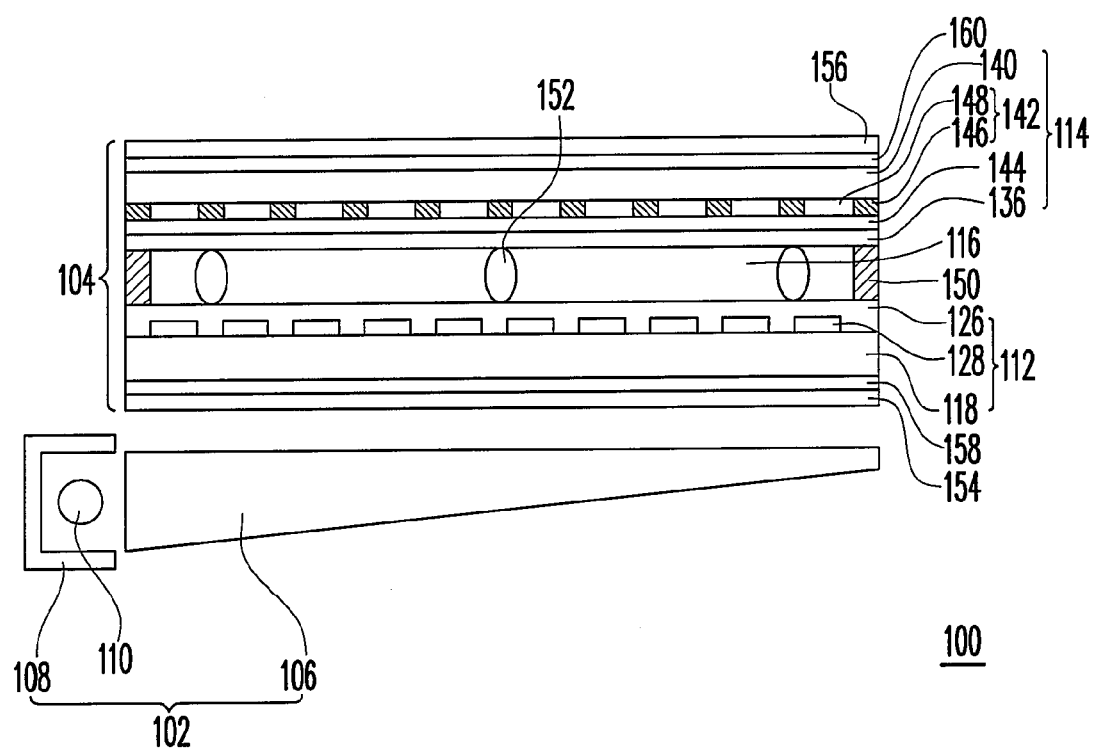
FIG. 2 is a schematic cross-sectional view of a LCD device according to an embodiment of the present invention.
Figure 3:
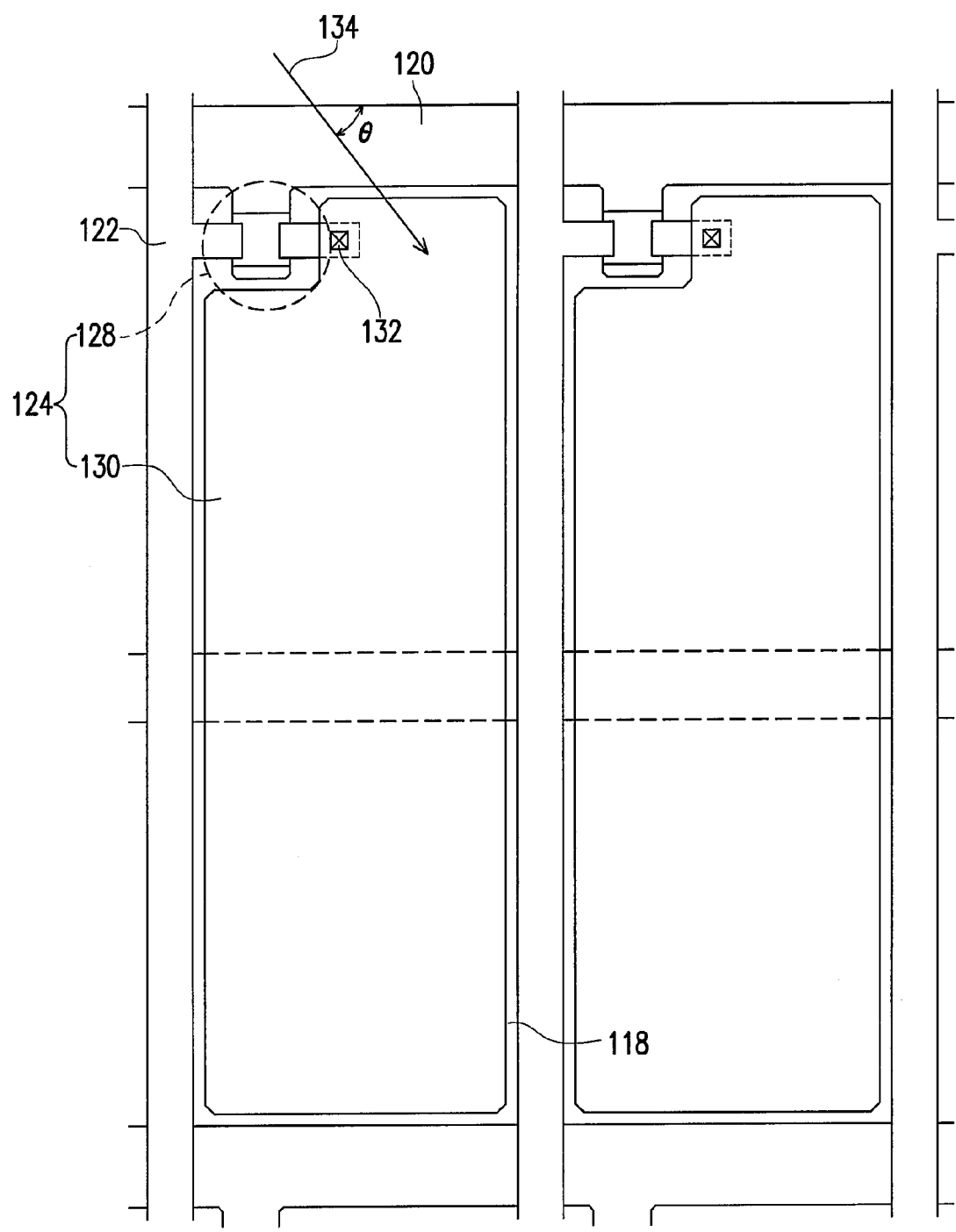
FIG. 3 is a schematic top view of an active component array substrate according to an embodiment of the present invention.
Figure 4:
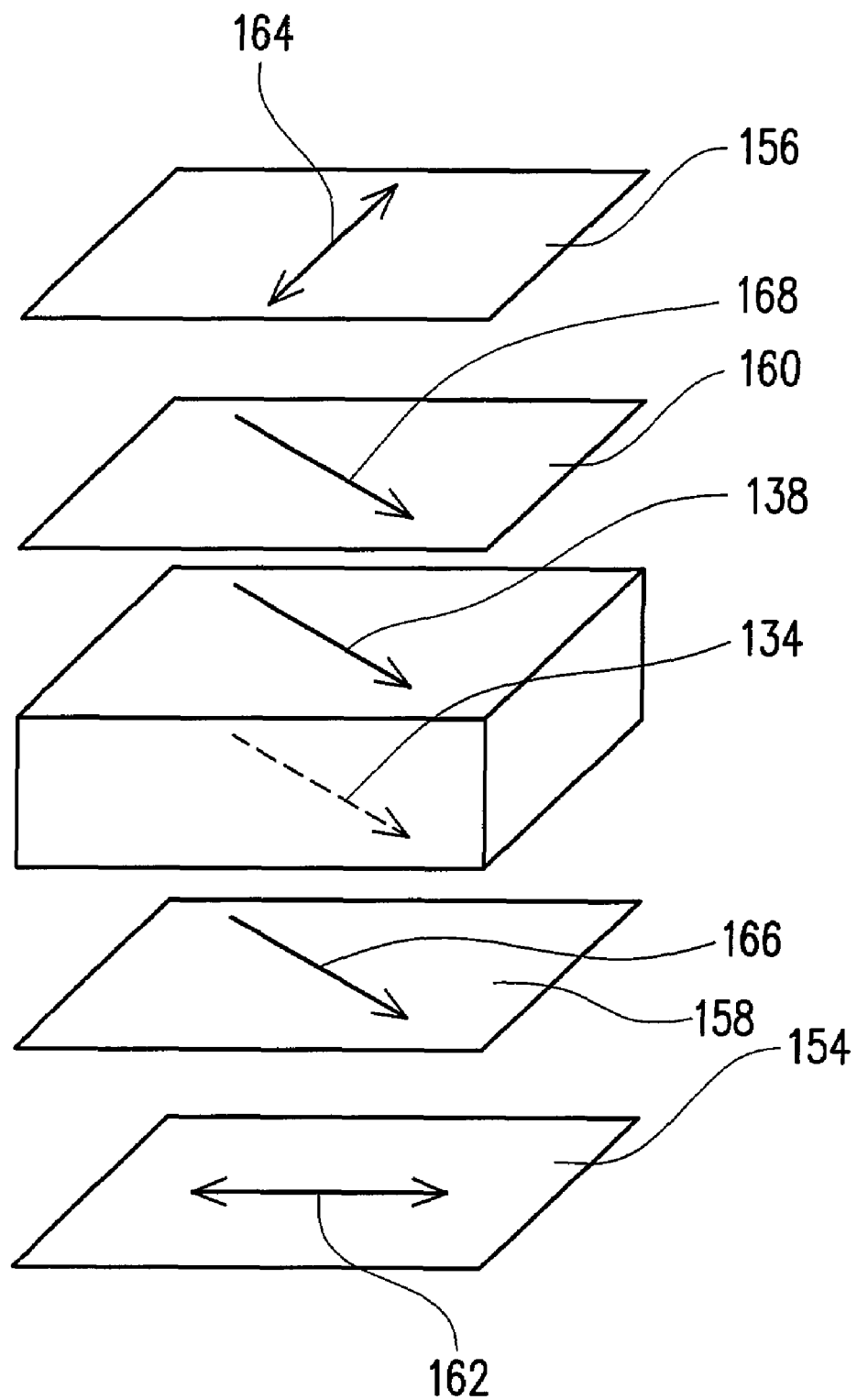
FIG. 4 is a diagram of a LCD panel according to an embodiment of the present invention.

FIG. 2 is a schematic cross-sectional view of a LCD device according to an embodiment of the present invention, FIG. 3 is a schematic top view of an active component array substrate according to an embodiment of the present invention and FIG. 4 is a diagram of a LCD panel according to an embodiment of the present invention.

Referring to FIG. 2, a LCD device 100 of the present embodiment includes a backlight module 102 and a LCD panel 104. Wherein, the backlight module 102 includes, for example, a light guide plate (LGP) 106, a reflective lampshade 108 and a light source 110. In more detail, the LGP 106 can be a wedge-shaped light guide plate. The reflective lampshade 108 is disposed at the side of the light incident end of the LGP 106 (not shown), while the light source 110 is disposed in the reflective lampshade 108. The above-described light source 110 can be a cold cathode fluorescence lamp (CCFL) or a light-emitting diode array (LED array), both of which are suitable for providing white light.

Referring to FIGS. 2 and 3, the LCD panel 104 is disposed on the backlight module 102. The LCD panel 102 includes an active component array substrate 112, an opposite substrate 114 and an OCB-type liquid crystal layer 116. Wherein, a sealant 150 and the OCB-type liquid crystal layer 116 are disposed between the active component array substrate 112 and the opposite substrate 114, and the sealant 150 encloses the OCB-type liquid crystal layer 116. In addition, spacers 152 may be disposed between the active component array substrate 112 and the opposite substrate 114 to keep a gap therebetween.

The active component array substrate 112 includes a first substrate 118, a plurality of first lines 120, a plurality of second lines 122, a plurality of pixel structures 124 and a first alignment layer 126. Wherein, the first lines 120 and the second lines 122 are disposed on the first substrate 118. In the embodiment, the first lines 120 are scan lines, while the second lines 122 are data lines. However, in another embodiment, the first lines 120 are data lines, and the second lines are scan lines.

The pixel structures 124 are disposed on the first substrate 118 and driven by the first lines 120 and the second lines 122. Each pixel structure 124 includes an active component 128 and a pixel electrode 130, and the active component 128 is electrically connected to the corresponding first line 120 and a corresponding line 122. In addition, the active component 128 can be a thin film transistor (TFT), and the pixel electrode 130 can be electrically connected to the active component 128 through a contact hole 132. The first alignment layer 126 is disposed on the first substrate 118 and covers the first lines 120, the second lines 122 and the pixel structures 124. The first alignment layer 126 possesses a first orientation direction 134 and the included angle θ between the first orientation direction 134 and the first lines 120 is between 46 and 74 degree, the better of the included angle θ is between 46 and 54 degree, and the best of the included angle θ is 50 degree.

Referring to FIGS. 2 and 4, the opposite substrate 114 includes a second substrate 140, a color filter layer 142, a common electrode layer 144 and a second alignment layer 136. Wherein, the color filter layer 142 is disposed on the second substrate 140, while the color filter layer 142 includes a black matrix 146 and a color filter film 148. The common electrode layer 144 is disposed on the color filter layer 142; the second alignment layer 136 is disposed on the common electrode layer 144 and possesses a second orientation direction 138 parallel to the first orientation direction 134.

Although the color filter layer 142 and the active component array substrate 112 are separately disposed in the present embodiment, nevertheless, the color filter layer 142 can be disposed on the active component array substrate 112 as well, which is termed as color filter on array (COA) substrate, wherein the opposite substrate 114 has no more color filter layer 142.

Referring to FIGS. 2 and 4, the LCD panel 104 of the embodiment can further include a first polarizing plate 154 and a second polarizing plate 156. In response to a normal white display or a normal white display, the polarizing directions of the first polarizing plate 154 and the second polarizing plate 156 are differentially arranged. Since the embodiment takes the normal black display, the first polarizing plate 154 is disposed on the active component array substrate 112 opposite to the opposite substrate 114, the first polarizing plate 154 possesses a first polarizing direction 162 and the first polarizing direction 162 is parallel to the first lines 120; the second polarizing plate 156 is disposed on the opposite substrate 114 opposite the active component array substrate 112, the second polarizing plate 156 possesses a second polarizing direction 164 and the second polarizing direction 164 is perpendicular to the first polarizing direction 162. However, if another embodiment takes normal black display, the first polarizing direction 162 of the first polarizing plate 154 must be parallel to the second polarizing direction 164 of the second polarizing plate 156.

Continuing to FIGS. 2 and 4, to improve display quality, the LCD panel 104 can further include a first compensation film 158 and a second compensation film 160. Wherein, the first compensation film 158 is disposed between the active component array substrate 112 and the first polarizing plate 154, and the first compensation film 158 possesses a first axis 166 parallel to the first orientation direction 134. The second compensation film 160 is disposed between the opposite substrate 114 and the first polarizing plate 156, and the second compensation film 158 possesses a second axis 168 parallel to the second orientation direction 138.

Since the included angle θ between the first orientation direction 134 of the first alignment layer 126 and the first line 120 is between 46 and 74 degree, therefore, in comparison with the prior art, the liquid crystal molecule orientations can be changed, which contributes to increase the viewing angle range to meet the wide view angle specification requirement. In addition, since the present invention changes the orientation directions of the alignment layers, a larger maximum contrast in comparison with the prior art is provided. The display quality of the LCD device 100 of the embodiment is described as follows.

Figure 5:
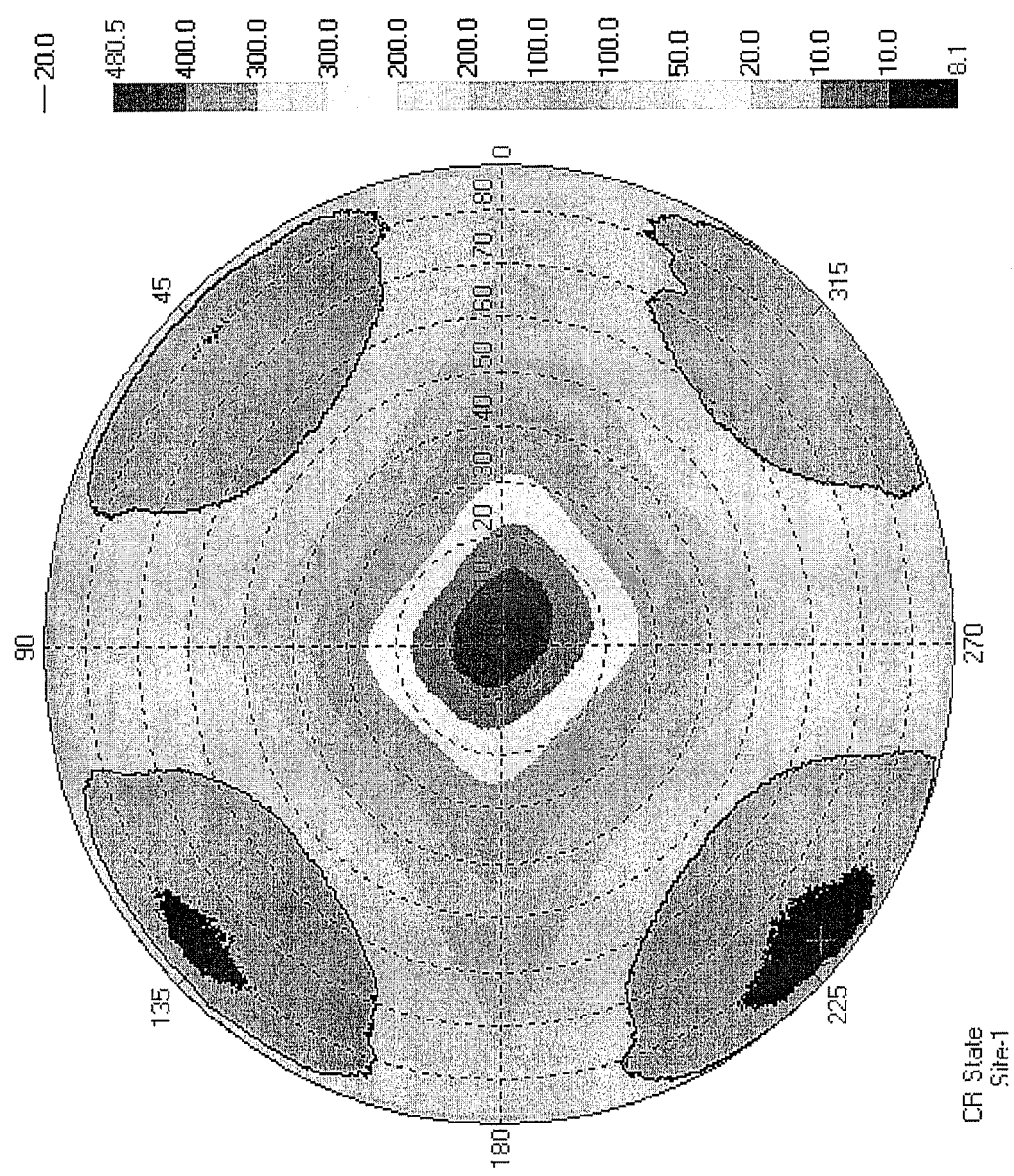
FIG. 5 is an angle of view contour of a LCD device according to an embodiment of the present invention.

FIG. 5 is an angle of view contour of a LCD device according to an embodiment of the present invention. Referring to FIG. 5, the included angle between the orientation direction of the alignment layer and the data line of the active component array substrate is 45 degree. The conducted experiment gives the results that under the lowest viewable condition with 10:1 contrast ratio, both the horizontal view angle and the vertical view angle can reach 170°, while the maximum contrast ratio can reach 480.5:1.

Figure 6:
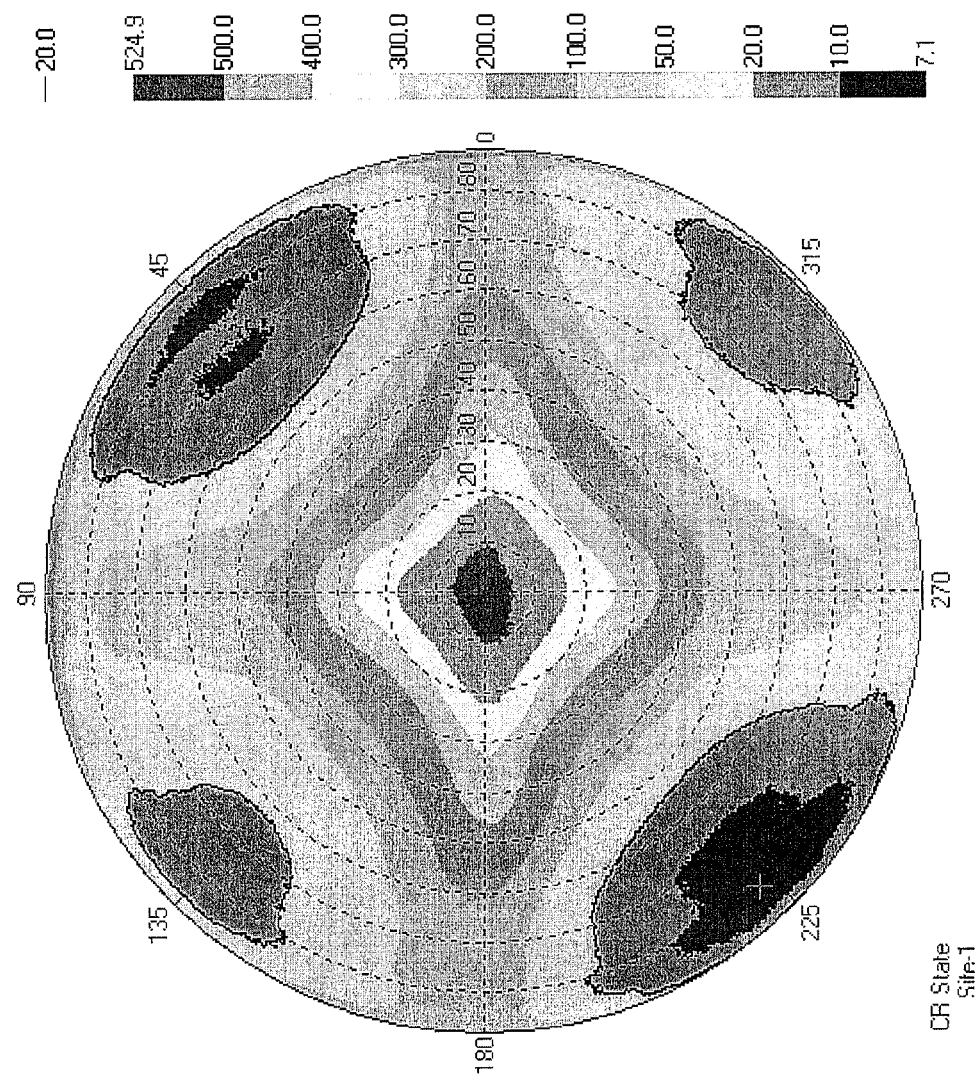
FIG. 6 is an angle of view contour of a LCD device according to another embodiment of the present invention.

FIG. 6 is an angle of view contour of a LCD device according to another embodiment of the present invention. Referring to FIG. 5, the included angle between the orientation direction of the alignment layer and the data line of the active component array substrate is 50 degree. The conducted experiment gives the results that under the lowest viewable condition with 10:1 contrast ratio, both the horizontal view angle and the vertical view angle can reach 170 degree, while the maximum contrast ratio can reach 524.9:1.

Figure 1:
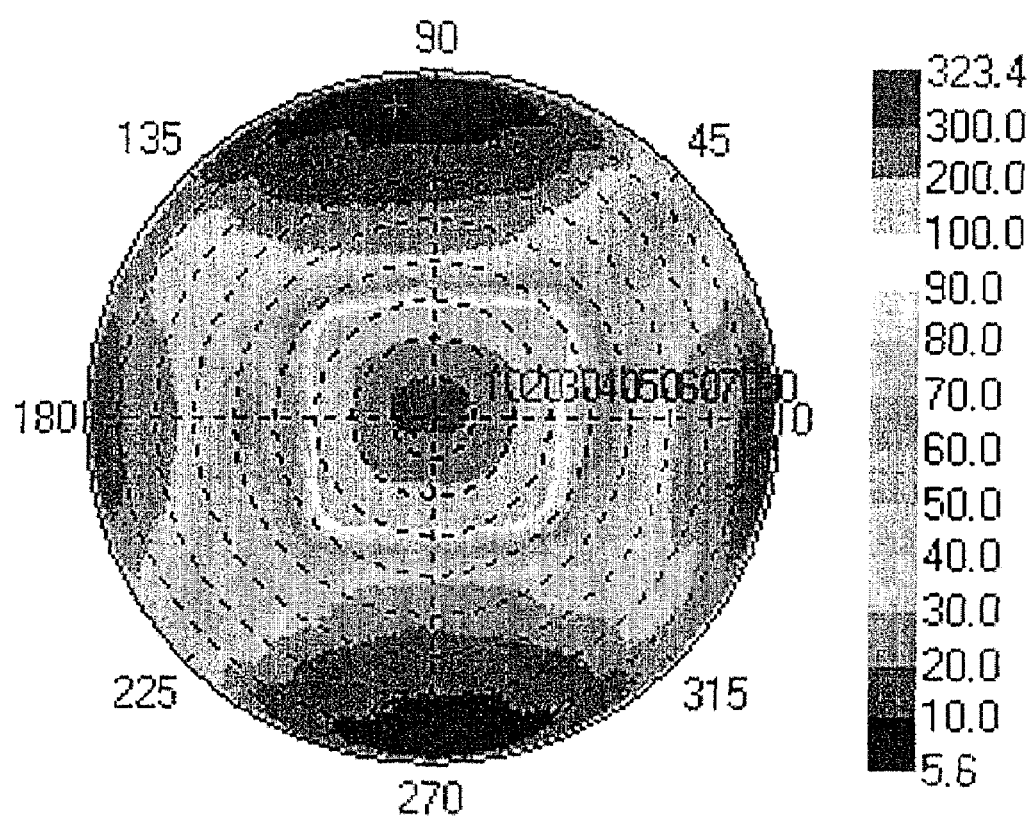
FIG. 1 is an angle of view contour of a conventional LCD device.

Referring to FIGS. 1, 5 and 6, a brief comparison between the present invented LCD device and the conventional LCD device can be made. In terms of optical performance, under the lowest viewable condition with 10:1 contrast ratio, the horizontal view angle, the vertical view angle and the maximum contrast ratio for the conventional LCD device are 160 degree, 140 degree, and 323.44:1 (as FIG. 1 showing), respectively; while the horizontal view angle, the vertical view angle and the maximum contrast ratio for the LCD device of the present invention are 170 degree, 170 degree, and 480.5:1 and 524.9:1 (as FIGS. 5 and 6 showing), respectively. It is clear that the present invention with the novel alignment layout largely improves the horizontal view angle, the vertical view angle and the maximum contrast ratio, compared with the prior art.

In summary, the present invention has at least the following advantages:

1. Since the present invention changes the orientation directions of the alignment layers, the LCD panel and the LCD device of the present invention have a larger viewing angle range than the prior art and can meet the wide view angle specification requirement.
2. The LCD panel and the LCD device of the present invention have a larger maximum contrast ratio.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A liquid crystal display panel (LCD panel), comprising:
    an active component array substrate, comprising:
        a first substrate;
        a plurality of first lines and a plurality of second lines, disposed on the first substrate;
        a plurality of pixel structures, disposed on the first substrate and driven by the first lines and the second lines;
        a first alignment layer, disposed on the first substrate and covering the first lines, the second lines and the pixel structures, wherein the first alignment layer possesses a first orientation direction, while the included angle between the first orientation direction and the first lines is between 46 and 74 degree;
    an opposite substrate, having a second alignment layer facing the active component array substrate, wherein the second alignment layer possesses a second orientation direction parallel to the first orientation direction; and
    an optically compensated birefringence type liquid crystal layer (OCB-type liquid crystal layer), disposed between the active component array substrate and the opposite substrate.

2. The LCD panel as recited in claim 1, wherein the included angle between the first orientation direction and the first lines is between 46 and 54 degree.

3. The LCD panel as recited in claim 1, wherein the first lines are scan lines and the second lines are data lines.

4. The LCD panel as recited in claim 1, wherein the first lines are data lines and the second lines are scan lines.

5. The LCD panel as recited in claim 1 further comprising:
    a first polarizing plate, disposed on the active component array substrate opposite to the opposite substrate, wherein the first polarizing plate possesses a first polarizing direction and the first polarizing direction is parallel to the first lines; and
    a second polarizing direction, disposed on the opposite substrate opposite to the active component array substrate, wherein the second polarizing plate possesses a second polarizing direction and the second polarizing direction is perpendicular to the first polarizing direction.

6. The LCD panel as recited in claim 5 further comprising:
    a first compensation film, disposed between the active component array substrate and the first polarizing plate, wherein the first compensation film possesses a first axis parallel to the first orientation direction; and
    a second compensation film, disposed between the opposite substrate and the second polarizing plate, wherein the second compensation film possesses a second axis parallel to the second orientation direction.

7. The LCD panel as recited in claim 1, wherein each pixel structure comprises:
    an active component, electrically connected to the corresponding first line and the corresponding second line; and
    a pixel electrode, electrically connected to the active component.

8. The LCD panel as recited in claim 1, wherein the opposite substrate further comprises:
    a second substrate;
    a color filter layer, disposed on the second substrate; and
    a common electrode layer, disposed on the color filter layer, wherein the second alignment layer is disposed on the common electrode layer.

9. A liquid crystal display device (LCD device), comprising:
    a backlight module; and
    a LCD panel, disposed on the backlight module; the LCD panel comprising:
        an active component array substrate, comprising:
            a first substrate;
            a plurality of first lines and a plurality of second lines, disposed on the first substrate;
            a plurality of pixel structures, disposed on the first substrate and driven by the first lines and the second lines;
            a first alignment layer, disposed on the first substrate and covering the first lines, the second lines and the pixel structures, wherein the first alignment layer possesses a first orientation direction, while the included angle between the first orientation direction and the first lines is between 46 and 74 degree;

an opposite substrate, having a second alignment layer facing the active component array substrate, wherein the second alignment layer possesses a second orientation direction parallel to the first orientation direction; and an optically compensated birefringence type liquid crystal layer (OCB-type liquid crystal layer), disposed between the active component array substrate and the opposite substrate.

10. The LCD device as recited in claim 9, wherein the included angle between the first orientation direction and the first lines is between 46 and 54 degree.

11. The LCD device as recited in claim 9, wherein the first lines are scan lines and the second lines are data lines.

12. The LCD device as recited in claim 9, wherein the first lines are data lines and the second lines are scan lines.

13. The LCD device as recited in claim 9 farther comprising:

a first polarizing plate, disposed on the active component array substrate opposite to the opposite substrate, wherein the first polarizing plate possesses a first polarizing direction and the first polarizing direction is parallel to the first lines; and a second polarizing direction, disposed on the opposite substrate opposite to the active component array substrate, wherein the second polarizing plate possesses a second polarizing direction and the second polarizing direction is perpendicular to the first polarizing direction.

14. The LCD device as recited in claim 13 further comprising:

a first compensation film, disposed between the active component array substrate and the first polarizing plate, wherein the first compensation film possesses a first axis parallel to the first orientation direction; and a second compensation film, disposed between the opposite substrate and the second polarizing plate, wherein the second compensation film possesses a second axis parallel to the second orientation direction.

15. The LCD device as recited in claim 9, wherein each pixel structure comprises:

an active component, electrically connected to the corresponding first line and the corresponding second line; and a pixel electrode, electrically connected to the active component.

16. The LCD device as recited in claim 9, wherein the opposite substrate further comprises:

a second substrate;

a color filter layer, disposed on the second substrate; and a common electrode layer, disposed on the color filter layer, wherein the second alignment layer is disposed on the common electrode layer.

* * * * *